(12) United States Patent
Park et al.

(10) Patent No.: US 8,175,337 B2
(45) Date of Patent: May 8, 2012

(54) APPARATUS AND METHOD OF MEASURING DISTANCE USING STRUCTURED LIGHT

(75) Inventors: Dong-ryeol Park, Hwaseong-si (KR);
Woo-yeon Jeong, Seoul (KR);
Seok-won Bang, Seoul (KR);
Hyoung-ki Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1197 days.

(21) Appl. No.: 11/987,116

(22) Filed: Nov. 27, 2007

(65) Prior Publication Data

US 2008/0159595 A1    Jul. 3, 2008

(30) Foreign Application Priority Data

Dec. 26, 2006   (KR) ................. 10-2006-0133908

(51) Int. Cl.
*G06K 9/00* (2006.01)
(52) U.S. Cl. ........ 382/106; 382/264; 382/172; 382/270; 382/272
(58) Field of Classification Search .......... 382/264, 382/172, 270, 154
See application file for complete search history.

(56) References Cited

U.S. PATENT DOCUMENTS

| | | | | |
|---|---|---|---|---|
| 3,728,025 A | * | 4/1973 | Madigan et al. | 356/5.12 |
| 4,821,334 A | * | 4/1989 | Ogino et al. | 382/270 |
| 4,871,252 A | * | 10/1989 | Beni et al. | 356/457 |
| 4,931,937 A | * | 6/1990 | Kakinami et al. | 701/300 |
| 5,016,173 A | * | 5/1991 | Kenet et al. | 382/128 |
| 5,100,229 A | * | 3/1992 | Lundberg et al. | 356/3.12 |
| 5,121,447 A | * | 6/1992 | Tanioka et al. | 382/268 |
| 5,293,427 A | * | 3/1994 | Ueno et al. | 382/103 |
| 5,396,331 A | * | 3/1995 | Kitoh et al. | 356/611 |
| 5,438,634 A | * | 8/1995 | Kumagai | 382/169 |
| 5,615,003 A | * | 3/1997 | Hermary et al. | 356/3.03 |
| 5,682,229 A | * | 10/1997 | Wangler | 356/4.01 |
| 5,729,624 A | * | 3/1998 | Tanioka et al. | 382/162 |
| 5,805,720 A | * | 9/1998 | Suenaga et al. | 382/117 |
| 5,930,383 A | * | 7/1999 | Netzer | 382/154 |
| 6,061,476 A | * | 5/2000 | Nichani | 382/270 |

(Continued)

FOREIGN PATENT DOCUMENTS

JP    63/128207    5/1988

(Continued)

OTHER PUBLICATIONS

Detection—sensor, Kiyotaka et al., 0-7803-7848-2,IEEE,2003, pp. 656-661.*

(Continued)

*Primary Examiner* — Jayesh A Patel
(74) *Attorney, Agent, or Firm* — Staas & Halsey LLP

(57) ABSTRACT

Provided are an apparatus and method of measuring a distance using structured light. The apparatus includes a binarization unit binarizing an image, an image identification unit identifying an image having connected pixels in the binarized image, a length ratio calculation unit obtaining the length ratio of the major axis of the image having the connected pixels to a minor axis perpendicular to the major axis, a pixel mean calculation unit obtaining the mean of pixel values of the image having the connected pixels, and an image extraction unit extracting an image formed by the light irradiated from the light source, from the images having connected pixels using the length ratio and the mean of the pixel values.

21 Claims, 16 Drawing Sheets

U.S. PATENT DOCUMENTS

| | | | |
|---|---|---|---|
| 6,144,366 A * | 11/2000 | Numazaki et al. | 345/156 |
| 6,208,419 B1 * | 3/2001 | Yamamoto et al. | 356/400 |
| 6,407,802 B1 * | 6/2002 | Nonaka | 356/3.08 |
| 6,441,888 B1 * | 8/2002 | Azuma et al. | 356/4.01 |
| 6,618,123 B2 * | 9/2003 | Uomori et al. | 356/3.12 |
| 7,237,919 B2 * | 7/2007 | Uomori et al. | 362/11 |
| 7,311,326 B2 * | 12/2007 | Matsuda et al. | 280/735 |
| 7,570,786 B2 * | 8/2009 | Ateya | 382/103 |
| 7,647,199 B2 * | 1/2010 | Green et al. | 702/150 |
| 7,724,379 B2 * | 5/2010 | Kawasaki et al. | 356/603 |
| 2001/0005219 A1 * | 6/2001 | Matsuo et al. | 348/169 |
| 2001/0052985 A1 * | 12/2001 | Ono | 356/614 |
| 2002/0085193 A1 * | 7/2002 | Ohtomo et al. | 356/4.01 |
| 2002/0110269 A1 * | 8/2002 | Floeder et al. | 382/141 |
| 2004/0096121 A1 * | 5/2004 | Kanatsu et al. | 382/290 |
| 2004/0240754 A1 * | 12/2004 | Smith et al. | 382/286 |
| 2005/0226505 A1 * | 10/2005 | Wilson | 382/180 |
| 2005/0238202 A1 * | 10/2005 | Sato et al. | 382/104 |

FOREIGN PATENT DOCUMENTS

| | | |
|---|---|---|
| JP | 7-128017 | 5/1995 |
| KR | 1999-0046244 | 7/1999 |
| KR | 10-2006-0091137 | 8/2006 |

OTHER PUBLICATIONS

Roger Y. Tsai, "A Versatile Camera Calibration Technique for High-Accuracy 3D Machine Vision Metrology Using Off-the-Shelf TV Cameras and Lenses", *IEEE Journal of Robotics and Automation*, vol. RA-3, No. 4, Aug. 1987; pp. 323-344.

\* cited by examiner

FIG. 5

| P1 | P2 | P3 |
|----|----|----|
| P4 | P5 | P6 |
| P7 | P8 | P9 |

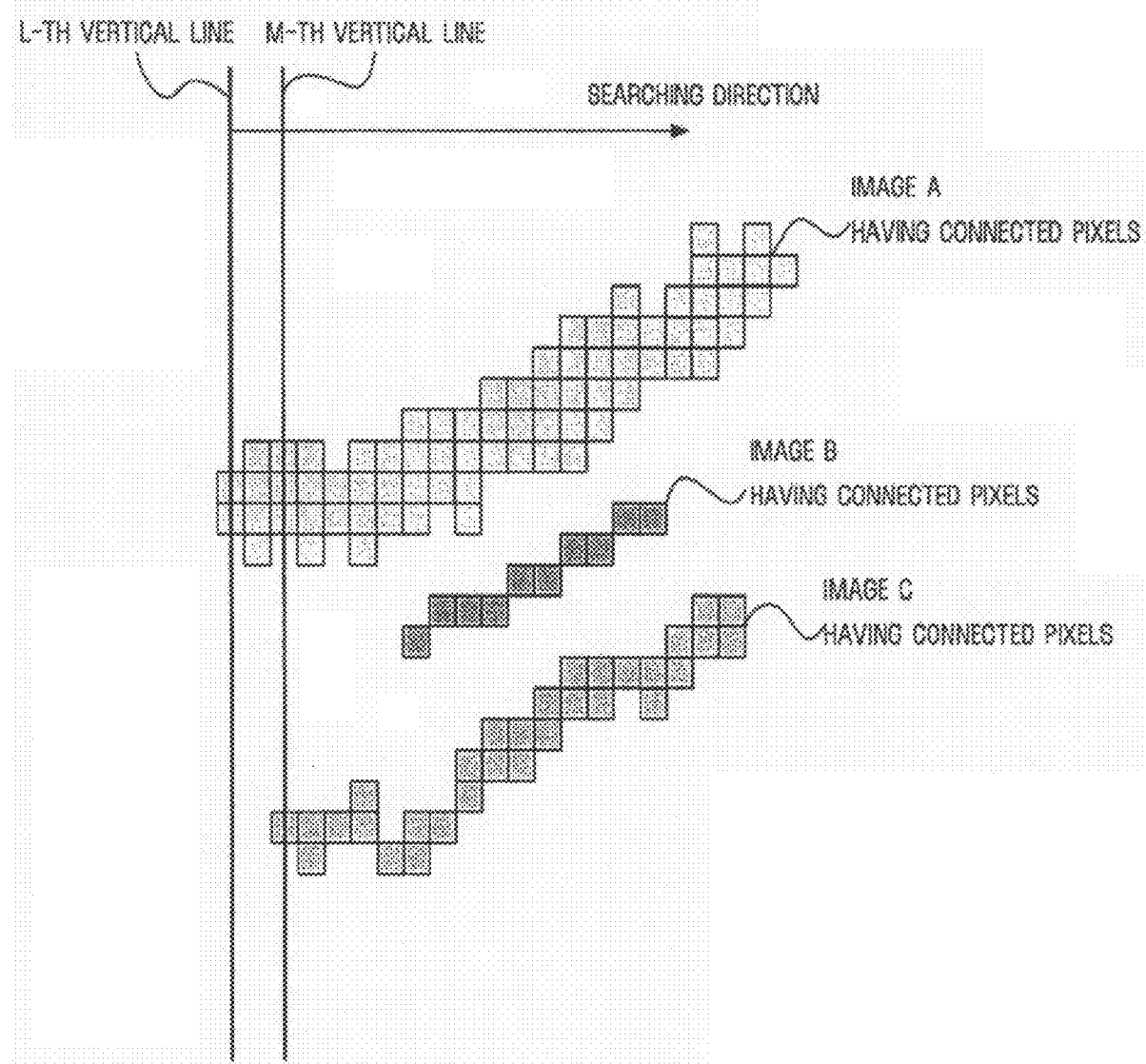

INPUT IMAGE

CALIBRATED IMAGE

BINARIZED IMAGE

NOISE-REMOVED IMAGE

PARABOLIC INTERPOLATION
METHOD NOT APPLIED

PARABOLIC INTERPOLATION
METHOD APPLIED

APPARATUS AND METHOD OF MEASURING DISTANCE USING STRUCTURED LIGHT

CROSS-REFERENCE TO RELATED APPLICATIONS

This application claims priority from Korean Patent Application No. 10-2006-0133908 filed on Dec. 26, 2006 in the Korean Intellectual Property Office, the disclosure of which is incorporated herein by reference in its entirety.

BACKGROUND

1. Field

The present invention relates to an apparatus and method of measuring a distance using structured light, and more particularly, to an apparatus and method of measuring a distance using structured light, in which an input image is binarized, and then an image having connected pixels in the binarized image is identified, and noise is removed using the length ratio of the major axis to the minor axis of the image having connected pixels in the binarized image and the mean of pixel values, thereby improving the accuracy of distance measurement.

2. Description of the Related Art

In order to travel around or perform a job in a place on which preliminary information is insufficient, a mobile robot, such as a cleaning robot or a guide robot, needs to have an ability to autonomously plan a path, detect an obstacle, and avoid collision. To achieve this, an ability to measure a distance to an obstacle, which can be used in order to estimate a position, is essential. Also, an ability to measure a distance to an obstacle is necessary in an intrusion sensing system using an image comparison method.

To measure such distances, a variety of methods using a visual sensor, an ultrasound sensor, or a contact sensor have been used. Among these methods, a method using structured light and a camera is very effective, because the method requires less computation and can be used in a place where a change in brightness is small.

According to this method, as illustrated in FIG. 1A, light is irradiated to an obstacle 30 using an active light source 10, such as a laser, and the image of the reflected light is obtained using a sensor 20, such as a camera. Then, using the image coordinates of the camera 20, the scanning angle of the image at that time, and the distance between the camera 20 and the laser beam emission position, the distance between the position of laser emission and the obstacle 30 where the laser light is reflected can be calculated from the obtained image according to a triangular method using angle θ.

Referring to FIG. 1A, the distance d between the light source 10 and the camera sensor 20 is referred to as a baseline. As this distance increases, the resolution becomes worse. When the height of a robot is limited as is that of a cleaning robot, the baseline distance is short in many cases. In such cases, the range resolution at a distant position becomes worse.

FIG. 2 is a diagram illustrating a range resolution with respect to a distance when the length of a baseline according to a conventional technology is short (for example, 8 cm).

FIG. 2 shows a resolution with respect to a length when the baseline is 8 cm, the vertical pixel of a camera is 480, and the vertical lens angle is 60°, and it can be seen that with increasing distance, the resolution becomes worse. In this case, a peak detection method can be used.

FIG. 3 is a diagram illustrating the distribution of pixel values of pixels arranged along a predetermined vertical line of a camera image. As illustrated in FIG. 3, assuming that the positions and pixel values of points a, b, and c are known and the brightness distribution of an image formed by the pixels arranged along the vertical line forms a parabola, the position of the peak point can be identified using a parabolic interpolation method. The distance to an obstacle can be identified by applying the triangular method described above to the position of the peak point.

However, in actual practice, it is quite difficult to accurately identify the positions of points a, b, and c due to a serious noise caused by reflection of sunrays or other illuminations and laser light.

SUMMARY

Accordingly, it is an aspect of the present invention to provide an apparatus and method of measuring a distance using structured light, in which an input image is binarized, and then an image having connected pixels in the binarized image is identified, and noise is removed using the length ratio of the major axis to the minor axis of the image having connected pixels in the binarized image and the mean of pixel values, thereby improving the accuracy of distance measurement.

Additional aspects and/or advantages will be set forth in part in the description which follows and, in part, will be apparent from the description, or may be learned by practice of the invention.

According to an aspect of the present invention, there is provided an apparatus measuring a distance using structured light, in which a light source emitting light from a predetermined light source and a camera module capturing an image formed when the light from the predetermined light source is reflected by an obstacle, are disposed and the distance is measured using the captured image, the apparatus including a binarization unit binarizing the image, an image identification unit identifying an image having connected pixels in the binarized image, a length ratio calculation unit obtaining a length ratio of a major axis of the image having the connected pixels to a minor axis perpendicular to the major axis, a pixel mean calculation unit obtaining the mean of pixel values of the image having the connected pixels, and an image extraction unit extracting an image formed by the light emitted from the light source, from the image having connected pixels using the length ratio and the mean of the pixel values.

According to another aspect of the present invention, there is provided a method of measuring a distance using structured light, in which light is emitted from a predetermined light source and then reflected by an obstacle and the distance is measured using a captured image formed by the light reflected by the obstacle, the method including binarizing the image, identifying an image having connected pixels in the binarized image, obtaining a length ratio of a major axis of the image having the connected pixels to a minor axis perpendicular to the major axis, and a mean of pixel values of the image having the connected pixels, and extracting an image formed by the light emitted from the light source, from the image having connected pixels using the length ratio and the mean of the pixel values.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a diagram illustrating a process of identifying an image having connected pixels according to an embodiment of the present invention;

FIGS. 10(a) through 10(c) are diagrams illustrating a process of extracting an image having connected pixels by removing noise according to an embodiment of the present invention.

DETAILED DESCRIPTION OF THE EMBODIMENTS

Figure 1A:
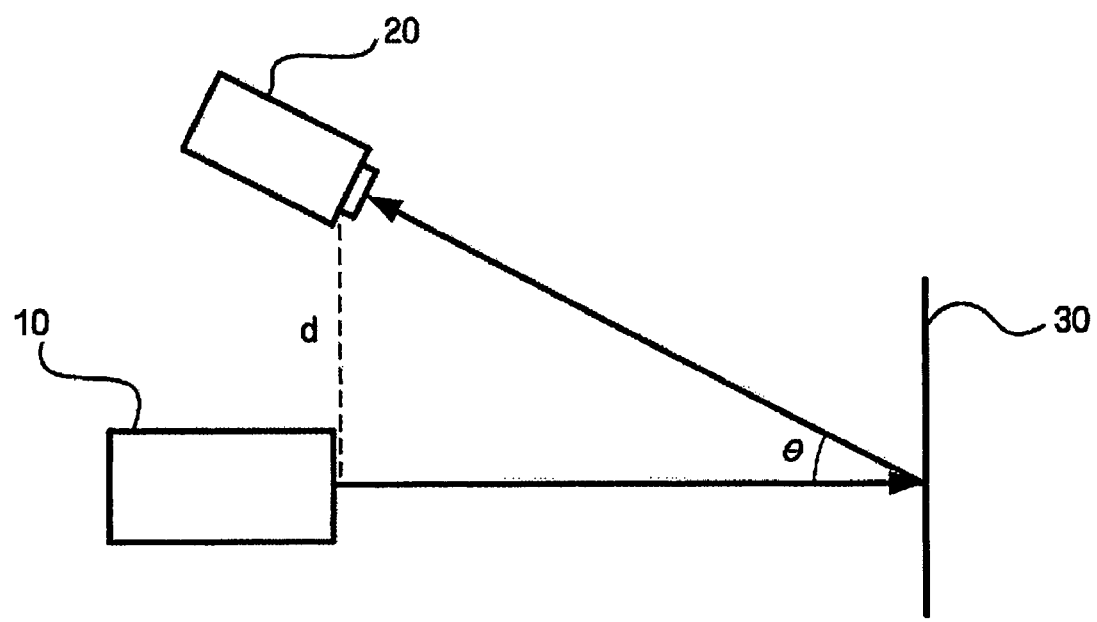
FIG. 1(a) is a side view of an apparatus for measuring a distance using structured light according to the related art.

Reference will now be made in detail to the embodiments, examples of which are illustrated in the accompanying drawings, wherein like reference numerals refer to the like elements throughout. The embodiments are described below to explain the present invention by referring to the figures.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will be defined by the appended claims.

First, a principle of measuring a distance using structured light according to the present invention will now be explained.

Figure 1B:
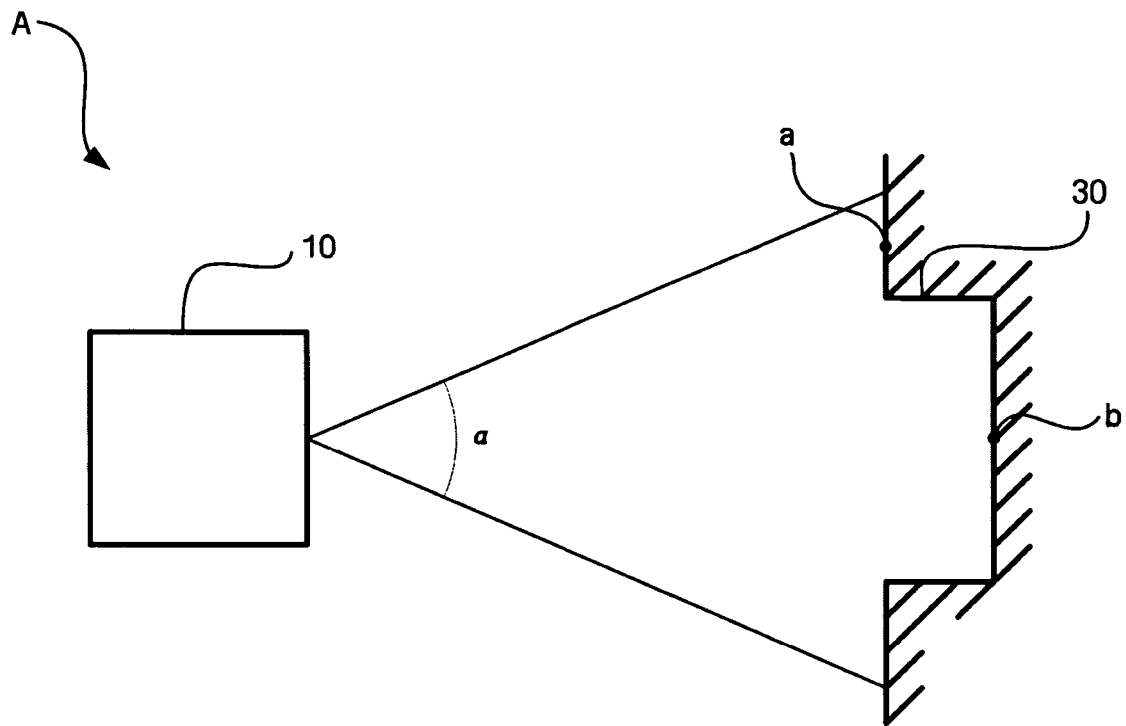
FIGS. 1(b)(a) and 1(b)(b) are a diagrams illustrating emission of light to an obstacle in order to obtain a structured light image, and a camera image obtained by a camera sensor according to an embodiment of the present invention.
Figure 1B:
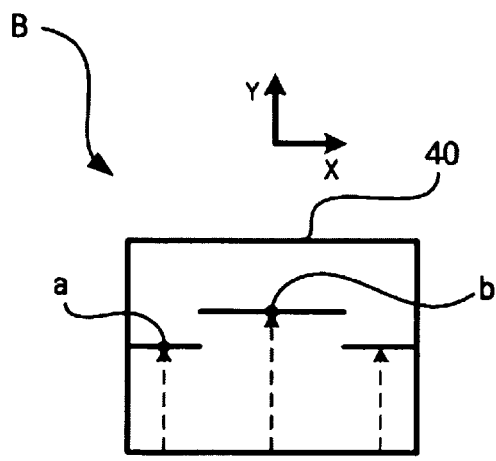
Figure 2:
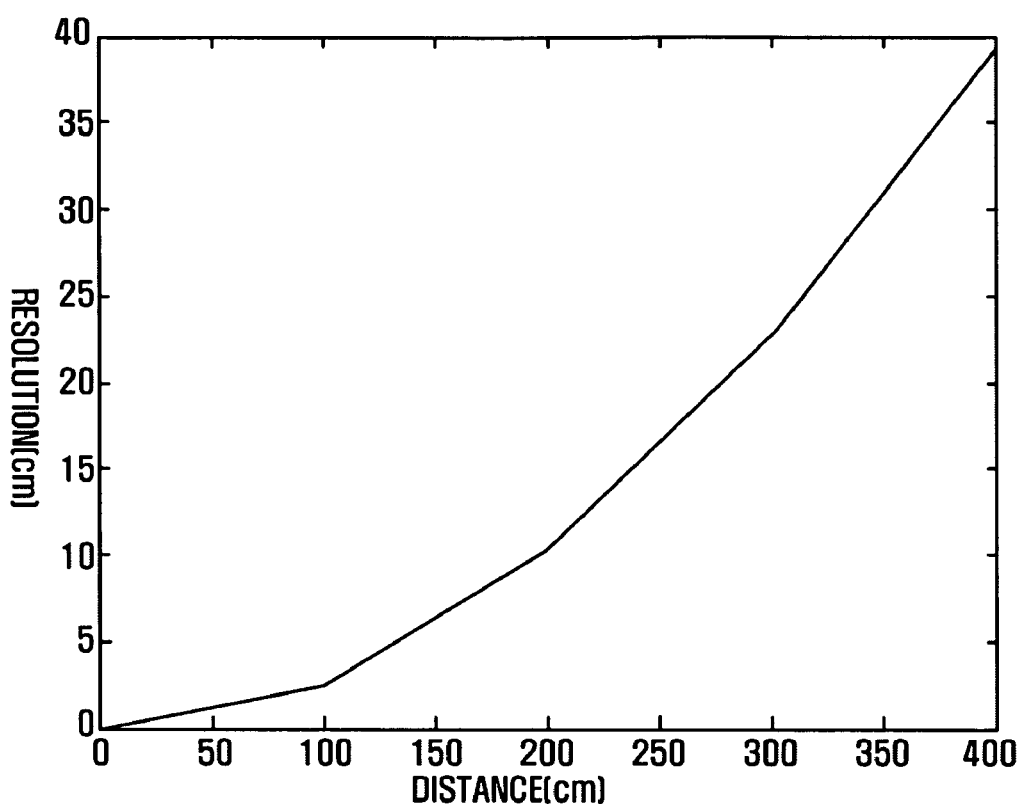
FIG. 2 is a diagram illustrating a range resolution with respect to a distance when the length of a baseline according to a conventional technology is short (8 cm)

FIG. 1(a) is a diagram illustrating from a side, an apparatus for measuring a distance using structured light according to an embodiment of the present invention, and FIGS. 1(b)(a) and 1(b)(b) are diagrams illustrating emission of light to an obstacle in order to obtain a structured light image, and a camera image obtained by a camera sensor according to an embodiment of the present invention.

Using an active light source 10, such as a laser, light is irradiated to an obstacle 30, and using a sensor 20 such as a camera, information on an image reflected by the obstacle 30 is obtained. In this case, while maintaining a predetermined distance d from the camera sensor 20 to the light source 10, the camera sensor 20 is positioned above the light source 10, and obtains the image information. The light source 10 may use a near infrared ray line laser beam. If the near infrared ray line laser beam is used, image information can be obtained even in a state where no illumination exists.

Referring to FIGS. 1(b)(a) and 1(b)(b), a laser light is irradiated from the light source 10 to the obstacle 30 such that the laser light has a predetermined field of view (α) and has a planar shape. FIG. 1(b)(b) shows a camera image 40 in the form of a line profile obtained by the camera 20. FIG. 1(b)(a) shows lights reflected at position a and position b of the obstacle 30 appear as a and b, respectively, of the camera image 40. A value in the Y-axis direction is in proportion to the distance between the sensor 20 and the obstacle 30.

Using the distance between the camera module 20 and the obstacle 30 obtained from the coordinates of the camera image 40, the angle (θ) (FIG. 1(a)) of the camera sensor 20 directed to the obstacle 30, and the distance (d) between the camera module 20 and the light source 10, the distance data between the light source 10 and the obstacle 30 can be obtained according to a triangular method. Here, since the triangular method is a known technology, detailed explanation of the method will be omitted here.

Figure 4:
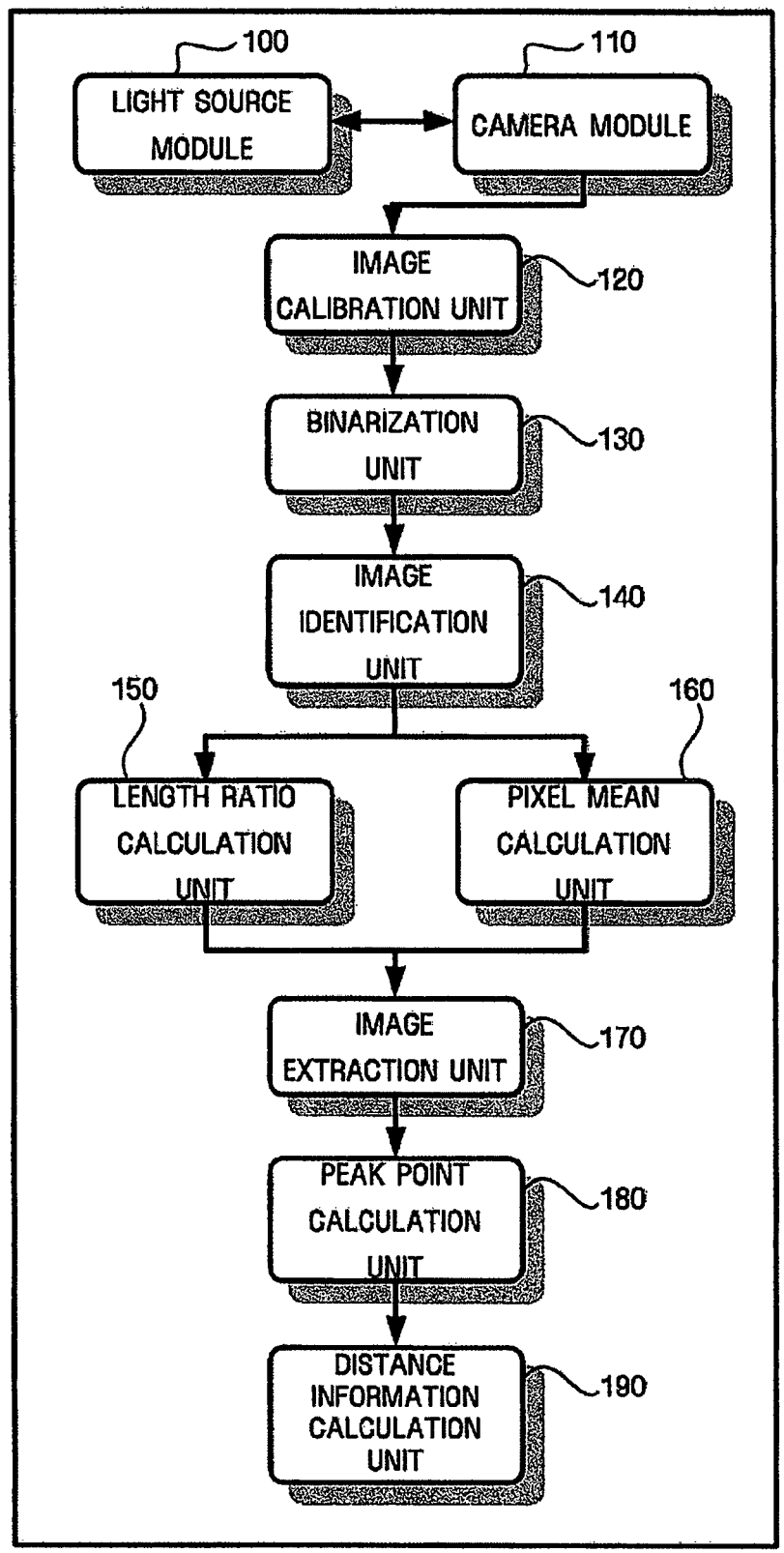
FIG. 4 is a block diagram of an apparatus measuring a distance using a structured light according to an embodiment of the present invention.

FIG. 4 is a block diagram of an apparatus measuring a distance using a structured light according to an embodiment of the present invention.

The apparatus measuring a distance using structured light according to the current embodiment may include a light source module 100, a camera module 110, a binarization unit 130, an image identification unit 140, a length ratio calculation unit 150, a pixel mean calculation unit 160, and an image extraction unit 170. Also, the apparatus may further include an image calibration unit 120, a peak point calculation unit 180, and a distance information calculation unit 190.

Meanwhile, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The light source module 100 projects a line laser to an obstacle. The line laser is spread in the horizontal direction and irradiated as illustrated in FIGS. 1(b)(a) and 1(b)(b).

The camera module 110 captures an image formed by the line laser irradiated from the light source module 100 and reflected by the obstacle. In this case, a band pass filter may be disposed in the camera module 110 such that only the light of a predetermined frequency band from the light source can be input. Accordingly, the camera module 110 can receive an input of light having a frequency close to that of the laser light source. However, even if this band pass filter is disposed, other light sources (that is, noise) in the vicinity of the frequency can still exist. In particular, natural light has a wide frequency band, and it is highly probable that noise is included in an image input to the camera module 110. The camera module 110 exists at a predetermined position above the light source module 100. As described above, the distance between the camera module 110 and the light source module 100 is referred to as a baseline.

The image calibration unit 120 calibrates the image captured by the camera module 110.

Since the light irradiated from the light source module 100 is captured by the camera module 110 at a predetermined angle, the image has a little irregularity, and this is corrected. As the method of calibration, Tsai's calibration method can be used. This is described in detail in R. Y. Tsai, "An efficient and accurate camera calibration technique for 3D machine vision", in Proc. IEEE Conf. on Computer Vision and Pattern Recognition, pp. 364~374 (1986), and the explanation will be omitted here.

The binarization unit 130 binarizes the image captured by the camera module 110. An image calibrated by the image calibration unit 120 may also be binarized. Through the binarization of all pixels in the entire image, all pixels that are determined to be generated not by the light reflected by the obstacle are changed to 0. According to a binarization method, using a simple line pattern formed in a predetermined position, a kernel shape and an optimum threshold are determined in each vertical interval of the image, and using the determined kernel shape and the optimum threshold, the actual captured image is convoluted. Then, pixel columns included in the convoluted image are scanned in the vertical direction. If a plurality of pixel groups in which pixel values are not 0 exists, the pixel values of pixel groups except one selected pixel group are changed to 0. This method is described in detail in a laid-open patent application 10-2006-0091137. Other known binarization methods can also be used in addition to the method described above.

Figure 5:
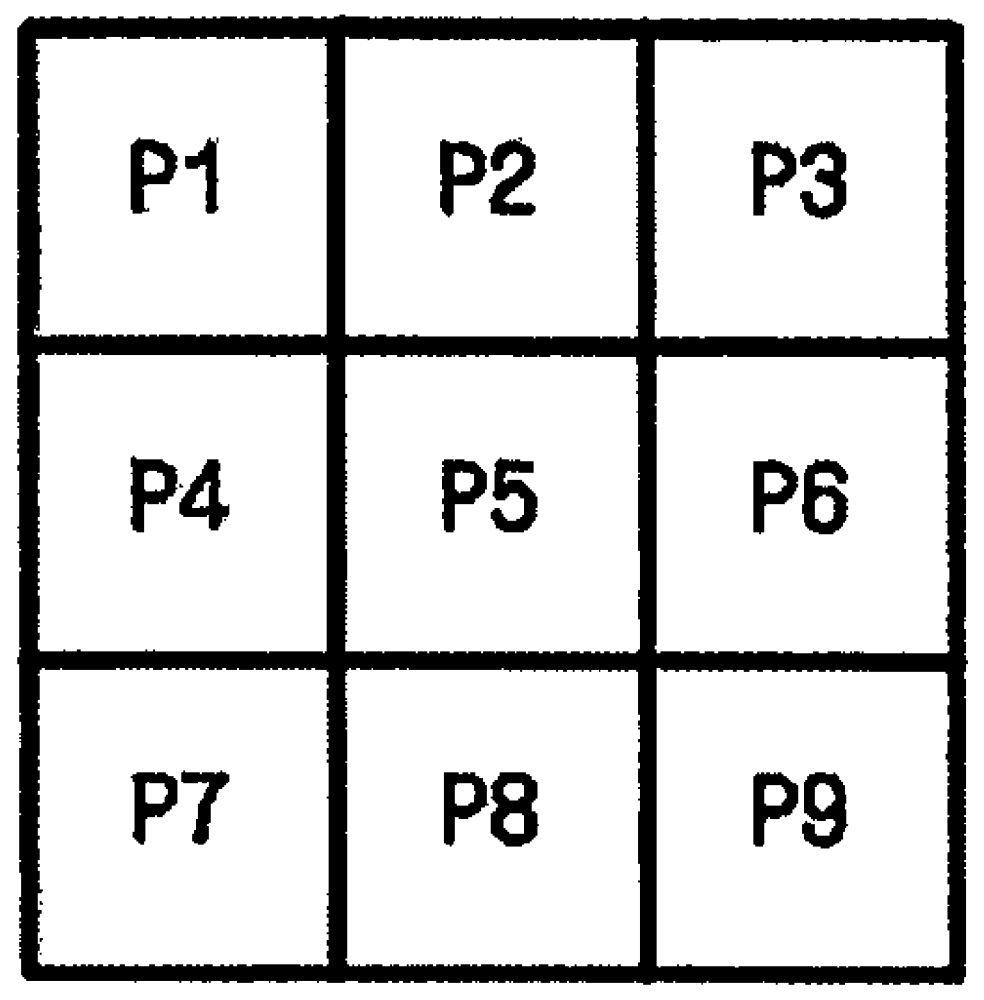

The image identification unit 140 identifies an image having connected pixels in the binarized image. FIG. 5 is a diagram illustrating a process of identifying an image having connected pixels according to an embodiment of the present invention. In FIG. 5, each square indicates one pixel. If P5 is binarized and then, P5 has a value other than 0, and if any one pixel among P1 through P9 surrounding P5 is binarized as a value other than 0, it is determined that the pixel is connected to P5. Through this process, each image having connected pixels is identified. Pixels that are not connected and are positioned apart can be removed.

The length ratio calculation unit 150 calculates the length ratio of the major axis of each image having connected pixels identified by the image identification unit 140, to the minor axis. Through principle component analysis (PCA), transform of the image having connected pixels, an eigenvector and an eigenvalue may be obtained. In this case, an eigenvalue having a bigger value indicates the degree of spread of the major axis, and an eigenvalue having a smaller value indicates the degree of spread of data in the direction perpendicular to the major axis. The ratio of the long axis to the short axis of each image having connected pixels can be expressed by a ratio of respective eigenvalues.

The pixel mean calculation unit 160 calculates the mean of pixel values of each image having connected pixels. In this case, by dividing the mean value by 255, a normalized value may be obtained.

The image extraction unit 170 removes noise in the image having connected pixels, using the length ratio of the major axis to the minor axis and the mean of the pixel values, and extracts a captured image formed by the light irradiated from the light source module 100. In this case, with the increasing ratio of the major axis to the minor axis, the probability that the image is generated by the light irradiated from the light source module 100 increases. This is because the shape of the irradiated structured light is linear, and if the pattern length of a binarized image is long, it is highly probable that the image is generated by the structured light irradiated from the light source module 100. When sunlight is emitted, much of the sunlight is usually removed during the binarization process, but part of sunlight emitted linearly may be binarized. In this case, using the length ratio of the major axis to the minor axis, the sunlight can be effectively removed.

Also, if the mean of pixel values is high, it is highly probable that the image is generated by the light irradiated from the light source 100. This is because if an irradiated structured light is reflected by a set of furniture or the floor and then, input, the light usually has a pixel value lower than that of a directly reflected structured light. Accordingly, the reflected light can be effectively removed using the mean of the pixel values.

As an example of extracting an image using the length ratio of the major axis to the minor axis and the mean of pixel values, assuming that the length ratio of the major axis to the minor axis of each image having connected pixels is L1, L2, . . . , and the mean of pixel values is G1, G2, . . . , $C_i=a*G_i+(1-a)L_i$ ($0 \leq a \leq 1$, i=1, 2, . . . , N) is calculated, and images each having connected pixels except an image having a largest $C_i$ value are removed. Here, a and (1−a) are the length ratio of the major axis to the minor axis and the mean of pixel values. If it is highly probable that other light sources exist, a weight to the length ratio of the major axis to the minor axis may be increased. If it is highly probable that a reflected light exists, a weight to the mean of pixel values may be increased. The above expression is an example of extracting an image using the length ratio of the major axis to the minor axis and the mean of pixel values. Other methods may also be used in order to extract an image.

In this case, the image extraction unit 170 may search the entire pixel area in each vertical line, thereby extracting an image formed by the light irradiated from a light source. This will be explained later with reference to FIGS. 10(a) through 10(c).

Figure 3:
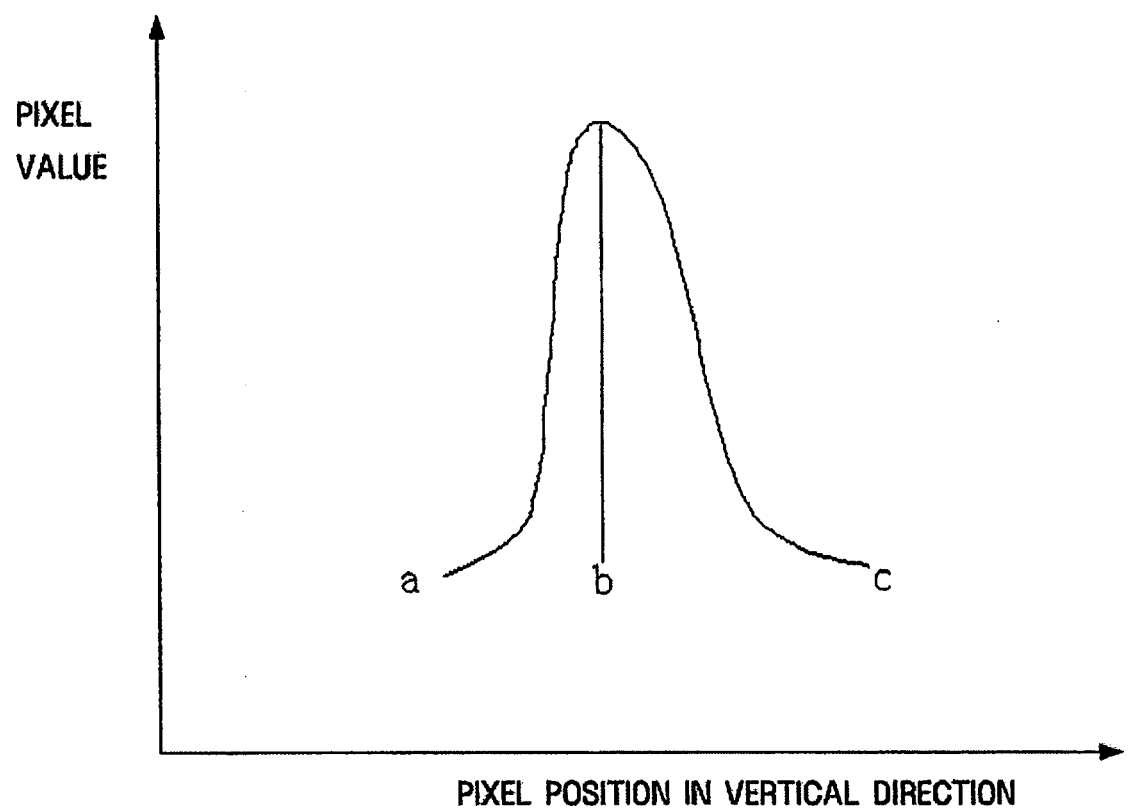
FIG. 3 is a diagram illustrating the distribution of pixel values of pixels arranged along a predetermined vertical line of a camera image according to the related art.

The peak point calculation unit 180 searches the entire pixel area of an image in each vertical line, thereby obtaining the position of a peak point of pixel values in each vertical line. If noise is removed, the image reflected by an obstacle includes a plurality of pixels and a thickness. In this case, it is highly probable that the position of a peak point having a highest pixel value is the position of reflection at the obstacle. Here, if it is assumed that the positions and pixel values of points a, b, and c are known as illustrated in FIG. 3 and the brightness distribution of an image formed by the pixels arranged along the vertical line forms a parabola, the position of a peak point can be identified by applying a parabolic interpolation method. In this case, the b value is the pixel position of a peak value in each vertical line of the entire pixel area. When a plurality of pixel positions of peak values exist, an area having a long connected length is selected, and the weight center of the connected area can be determined as the pixel position of a peak value.

Figure 6:
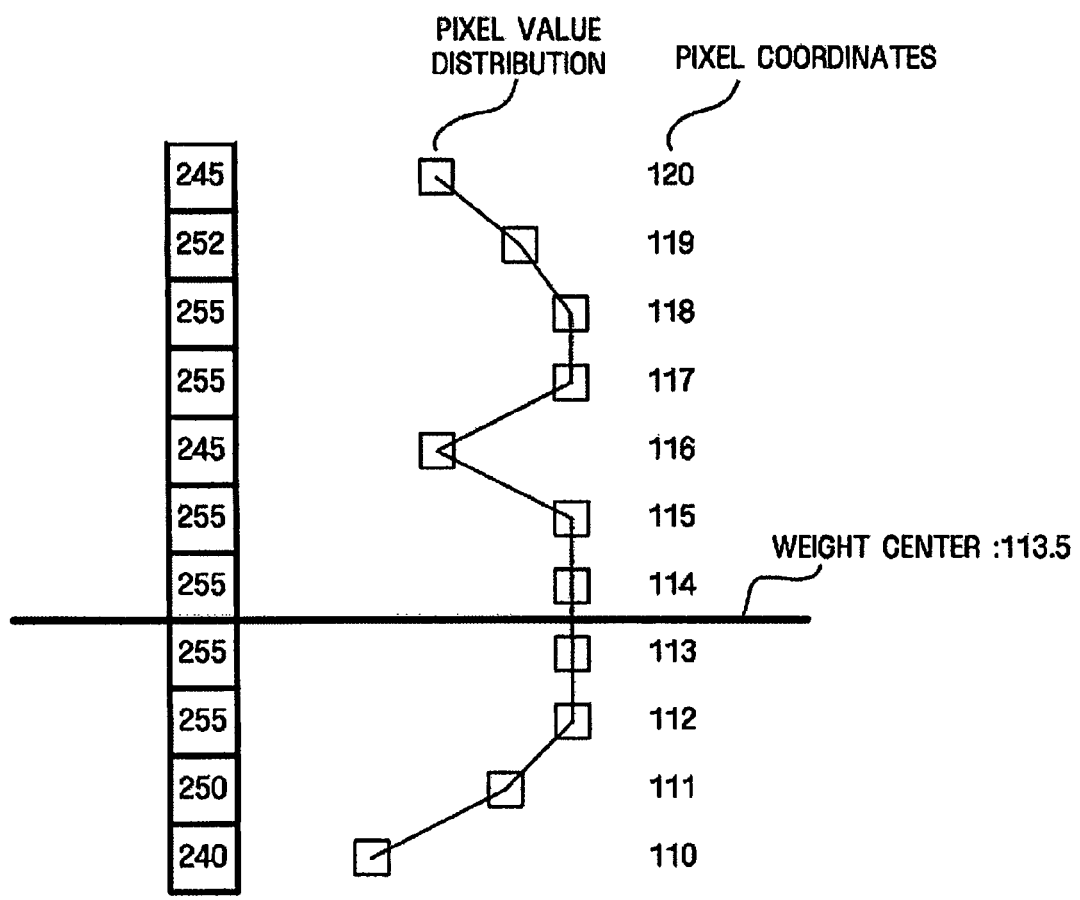
FIG. 6 is a diagram illustrating a process of finding pixel positions when a plurality of pixels having peak values exist, according to an embodiment of the present invention.

FIG. 6 is a diagram illustrating a process of finding pixel positions when a plurality of pixels having peak values exist, according to an embodiment of the present invention. Referring to FIG. 6, each pixel value of a vertical line is shown on the left and the distribution of pixel values is shown next to the pixel values. In this case, a plurality of pixel positions each having a peak value 255 exist. Two top 255 pixel values are connected and four 255 pixel values are connected below. Accordingly, the below area having a longer length is selected, and then, the weight center of positions is calculated. The center coordinate of the below four 255 pixel values is 113.5. This value can be selected as the position of the peak pixel value. Then, the points a and b that are the start point and the end point, respectively, can be determined by finding two boundary positions within a threshold range relative to the position of the peak pixel value. After obtaining the values of a, b, and c, the position of a peak point can be obtained according to a parabolic interpolation method. An example of a pseudo code implementing a parabolic interpolation method is shown below:

```
Start Parabolic Interpolation(float up, float middle, float down)
    a = (up + down) − 2.0 * middle / 2.0f
        if  a = 0, then return 0
    c = ((up − middle) / a) − 1.0f) / 2.0f );
        if   c < −0.5 or c > 0.5, then return 0;
            else return c
```

Here, 'up' is the pixel value of the start part of a parabola, 'middle' is the pixel value of the top part of the parabola, and 'down' is the pixel value of the end part of the parabola.

The distance information calculation unit 190 applies a triangular method to the position of a finally remaining peak point, thereby calculating the distance between the light source module 100 and the obstacle.

Figure 7:
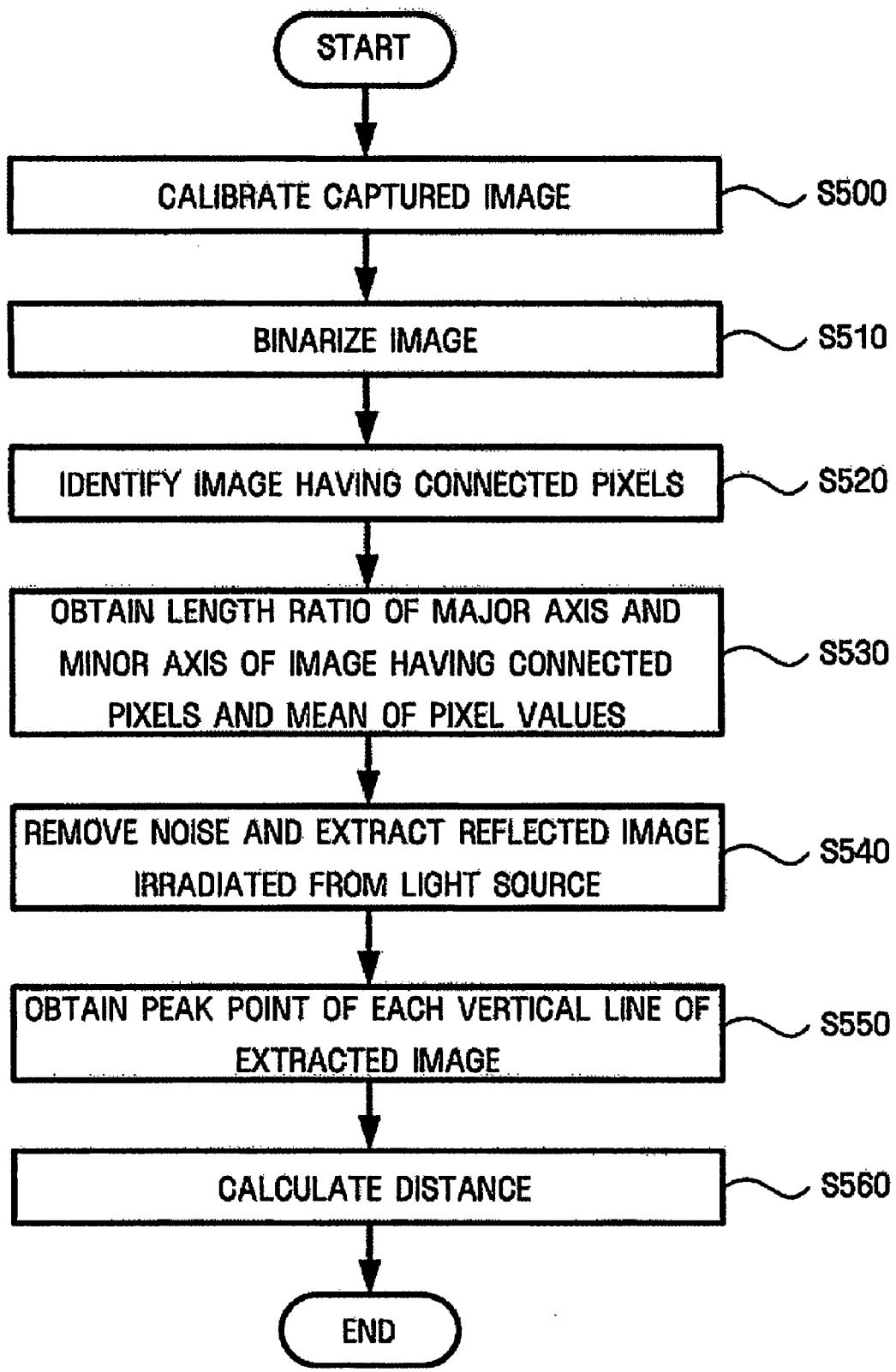
FIG. 7 is a flowchart illustrating a method of measuring a distance using structured light according to an embodiment of the present invention.
Figure 8:
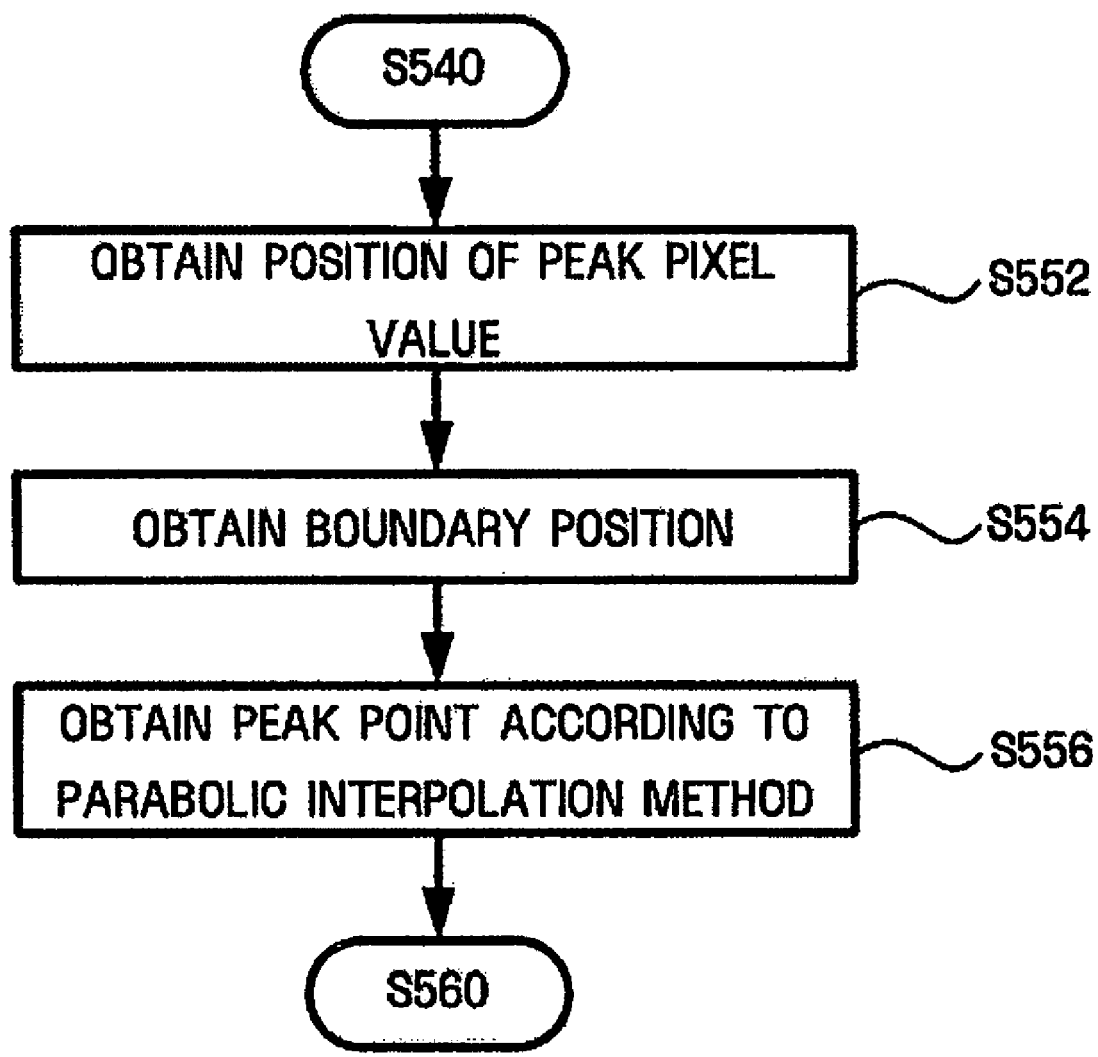
FIG. 8 is a flowchart illustrating a method of finding the position of a peak point according to an embodiment of the present invention.

FIG. 7 is a flowchart illustrating a method of measuring a distance using structured light according to an embodiment of the present invention, and FIG. 8 is a flowchart illustrating a method of finding the position of a peak point according to an embodiment of the present invention.

First, the image calibration unit 120 calibrates an image, which is generated by a line laser irradiated from the light source module 100 and reflected by an obstacle, and is captured by a camera, according to a method, such as Tsai's calibration method, in operation S500.

Then, the binarization unit 130 binarizes the calibrated image in operation S510.

The image identification unit 140 identifies images having connected pixels in the binarized image in operation S520.

Then, the length ratio calculation unit 150 and the pixel mean calculation unit 160 obtain the length ratio of the major axis to the minor axis of each image having connected pixels and the mean of pixel values, respectively, in operation S530. In this case, the image having connected pixels is PCA transformed and using the transformed image, the length ratio of the major axis to the minor axis can be calculated.

Next, using the length ratio of the major axis to the minor axis of each image having connected pixels and the mean of pixel values, the image extraction unit 170 removes noise that is not the image captured from the light irradiated from the light source module 100 in operation S540. In this case, if the length ratio of the major axis to the minor axis is big, it can be determined that it is highly probable that the image is generated by the light irradiated from the light source. Also, if the mean of pixel values is high, it can be determined that it is highly probable that the image is generated by the light irradiated from the light source. Then, by searching the entire pixel area in each vertical line, the image formed by the light irradiated from the light source can be extracted.

Next, the peak point calculation unit 180 obtains the peak point of each vertical line of the image, which is extracted in operation S540, in operation S550. In the obtaining of the peak point, first, the pixel position of a peak value in each vertical line of the image formed by the light irradiated from the light source is obtained in operation S552. Then, two boundary positions within a predetermined threshold range relative to the position of the peak pixel value are obtained in operation S554. Finally, using the position of the peak pixel value, the peak pixel value, two boundary positions, and pixel values, the position of a peak point is obtained according to a parabolic interpolation method in operation S556.

Next, the distance information calculation unit 190 applies a triangular method to the peak point, thereby calculating the distance between the light source module 100 and the obstacle in operation S560.

Figure 9:
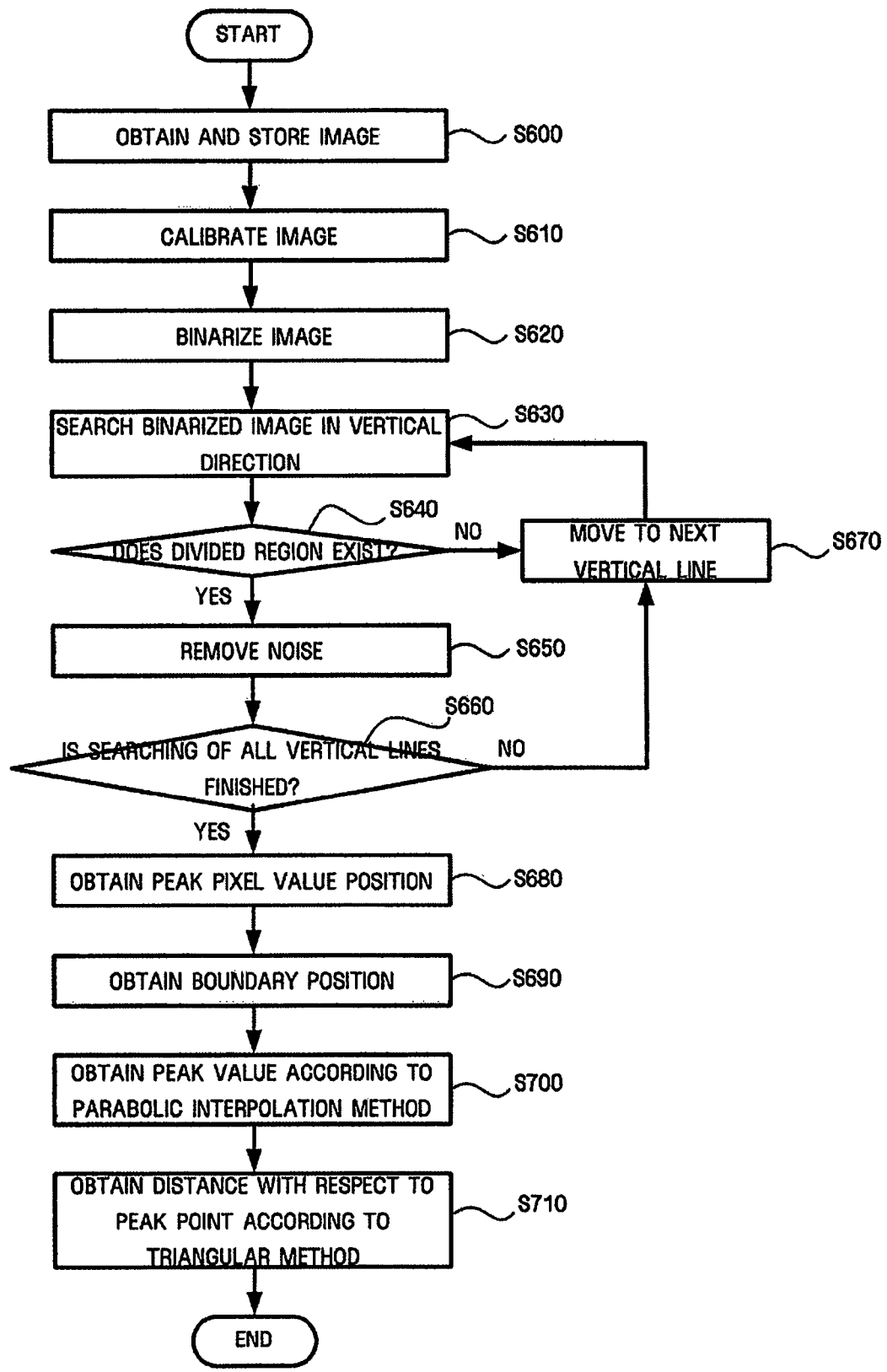
FIG. 9 is an entire flowchart illustrating a method of measuring a distance using a structured light according to an embodiment of the present invention.

FIG. 9 is an entire flowchart illustrating a method of measuring a distance using a structured light according to an embodiment of the present invention.

First, the camera module 110 obtains and stores an image formed by a line laser irradiated from the light source module 100 and reflected by an obstacle in operation S600. Then, the image calibration unit 120 calibrates distortion in the obtained image in operation S610. Then, the binarization unit 130 binarizes the calibrated image in operation S620. Then, each vertical line of the input image is searched in the vertical line direction in operation S630. While searching in the vertical direction, it is confirmed whether or not a divided area of the binarized image exists in operation S640. If it is confirmed that no divided area exists, the next vertical line is visited and searched in operation S630. If two or more divided areas exist, noise is removed by performing operations S520, 530, and 540, described above, in operation S650. If noise is removed, again a next vertical line is visited in operation S670, and it is confirmed whether or not a divided region exists in operation S640. If searching of all vertical lines is completed in operation S660, removal of noise is finished.

Figure 10B:
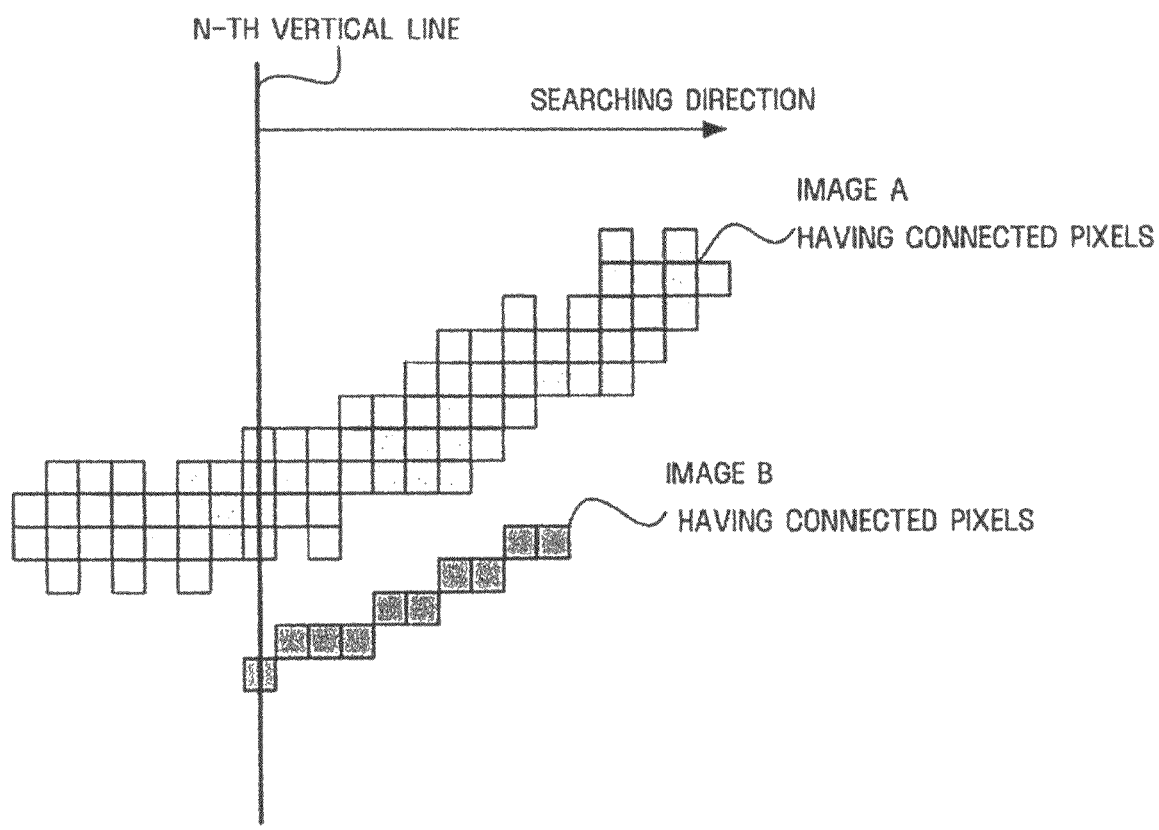
Figure 10C:
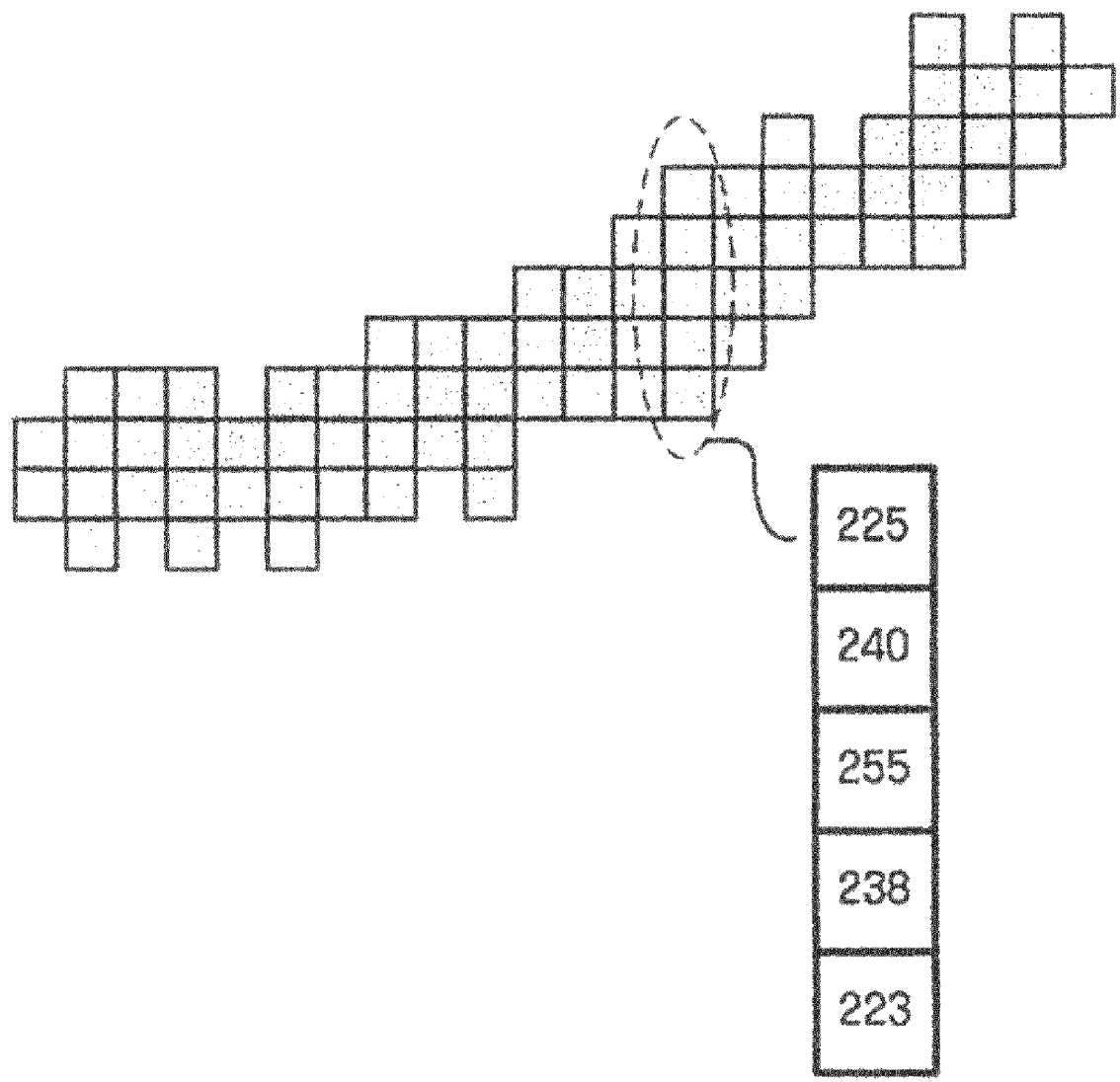
Figure 11A:
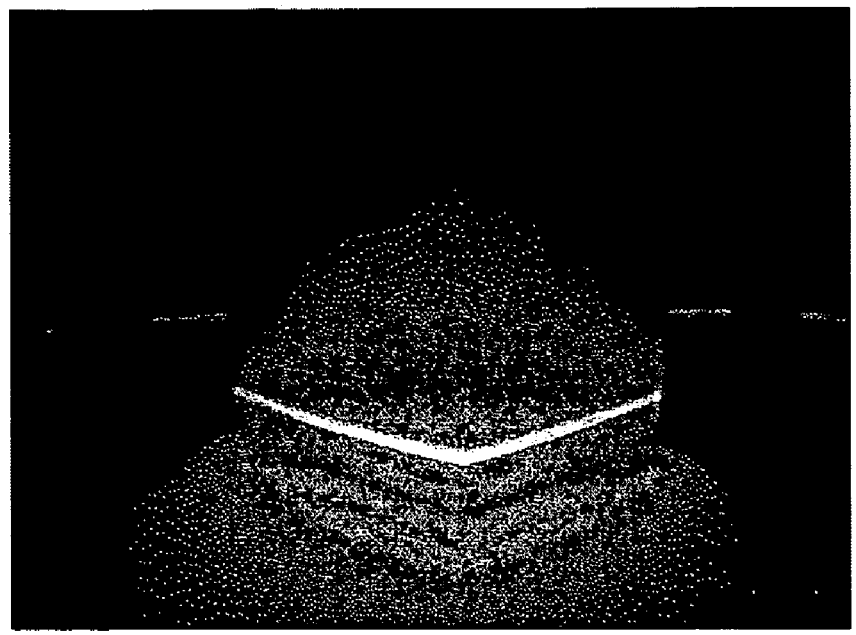
FIGS. 11(a) to 11(f) are diagrams illustrating an image in each operation and a measured distance according to an embodiment of the present invention.
Figure 11B:
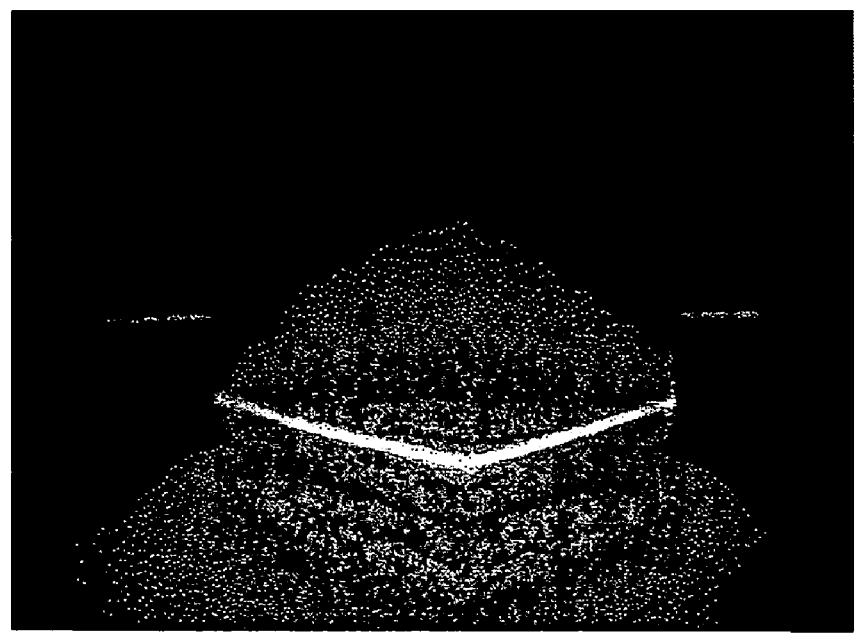
Figure 11C:
Figure 11D:
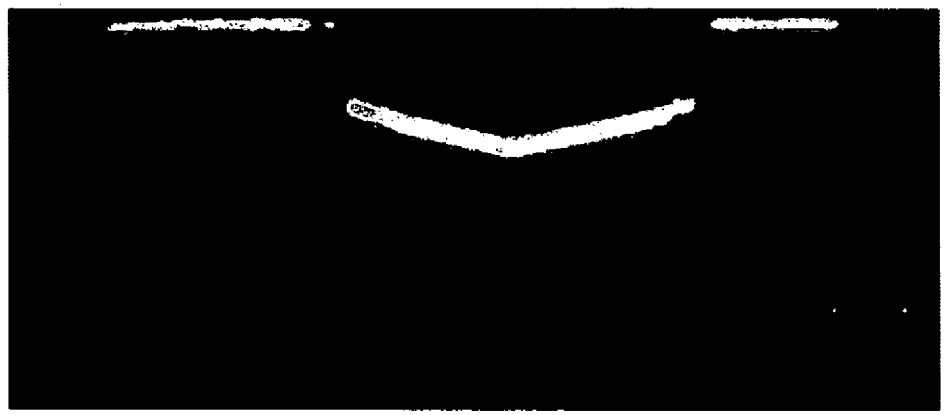
Figure 11E:
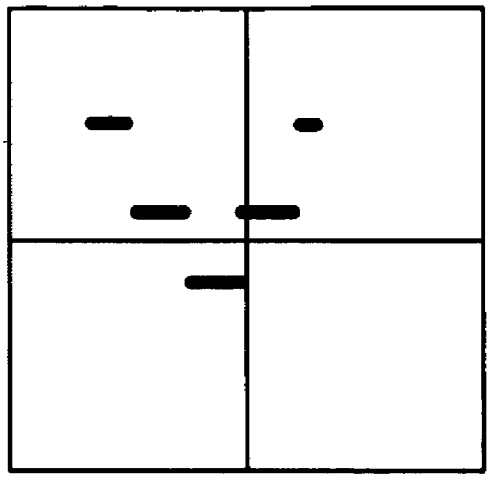
Figure 11F:
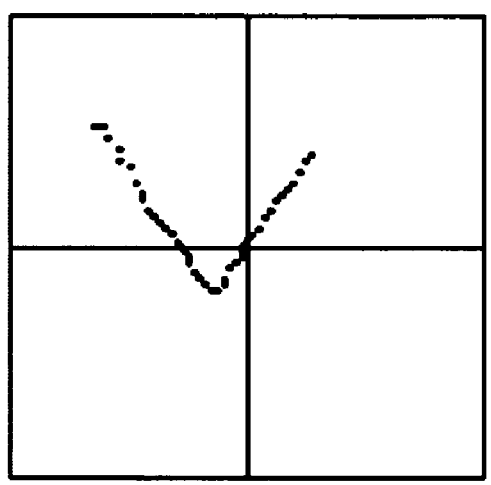

FIGS. 10(a) through 10(c) are diagrams illustrating a process of extracting an image having connected pixels by removing noise according to an embodiment of the present invention.

FIG. 10(a) shows that three images A, B, and C each having connected pixels are identified. In this case, the images are searched in the horizontal direction (from left to right in FIG. 10(a)) in order to determine whether or not a divided region exists. Since only the area A is found in the I-th vertical line, a next vertical line is searched. In the m-th vertical line, two divided areas A and B are found. Noise is removed using the length ratio of the major axis to the minor axis and the mean of pixel values in each of the areas A and C. Since the area A has a greater length ratio of the major axis to the minor axis and a higher mean of pixel values than those of the area C in FIG. 10(a), the area C is determined to be a noise area and is removed.

FIG. 10(b) illustrates the state after the area C is removed. Then, each vertical line is searched until a divided area appears in FIG. 10(b). In the n-th vertical line, two divided areas A and B are found. Using the length ratio of the major axis to the minor axis and the mean of pixel values in each of the areas A and B, it is determined that the area B is noise, and thus the area B is removed. Finally, FIG. 10(c) illustrates an image obtained from the light source by removing noise.

The pixel position of a peak value in each vertical line of the extracted image is searched for in operation S680. Then, two boundary positions relative to a predetermined threshold are searched for in operation S690. Using the pixel position of a peak value and the positions of the two boundaries, the position of a peak point is obtained according to a parabolic interpolation method in operation S700. After the position of the peak point is obtained, the distance between the light source module 100 and the obstacle is obtained according to a triangular method with reference to the peak point in operation S710.

FIGS. 11(a)-11(f) are diagrams illustrating an image in each operation and a measured distance according to an embodiment of the present invention.

FIG. 11 (a) illustrates an image obtained from a camera sensor. FIG. 11 (b) illustrates a result of calibrating by the image calibration unit 120 of a distorted image. FIG. 11 (c) illustrates a result of binarizing the calibrated image. In this case, two images forming a V shape exist at the center, and therefore it can be known that one of the two images is noise. FIG. 11 (d) illustrates a distance calculated by a triangular method without applying a parabolic interpolation method. FIG. 11 (f) illustrates a distance calculated according to a triangular method after the pixel position of a peak value and two boundary positions are obtained and a peak point is obtained by applying a parabolic interpolation method according to the present invention, as compared to FIG. 11(e), in which the parabolic interpolation method is not applied. It can be seen that the distance is measured more accurately when the parabolic interpolation method is applied than when the parabolic interpolation method is not applied.

As described above, the apparatus and method for measuring a distance using structured light according to the embodiments of the present invention have one or more of the following advantages.

First, an image input or reflected from another light source can be effectively removed, thereby improving the accuracy of distance measurement.

Second, the pixel position of a peak value and the positions of two boundary values for applying a parabolic interpolation method can be easily identified in a state where noise is removed. Accordingly, since the peak point is easily found, the accuracy of distance measurement can be improved.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus measuring a distance using structured light, in which a light source emitting light from a predetermined light source and a camera module capturing an image formed when the light from the predetermined light source is reflected by an obstacle, are disposed and the distance is measured using the captured image, the apparatus comprising:
a binarization unit binarizing the image;
an image identification unit identifying an image having connected pixels in the binarized image;
a length ratio calculation unit obtaining a length ratio of a major axis of the image having the connected pixels to a minor axis perpendicular to the major axis;
a pixel mean calculation unit obtaining the mean of pixel values of the image having the connected pixels; and
an image extraction unit extracting an image formed by the light emitted from the light source, from the image having the connected pixels using the length ratio and the mean of the pixel values.

2. The apparatus of claim 1, wherein the light source is a line laser.

3. The apparatus of claim 1, further comprising an image calibration unit calibrating the captured image.

4. The apparatus of claim 1, wherein the length ratio calculation unit performs a principle component analysis (PCA) transform of the image having the connected pixels, and using the transformed image, obtains the length ratio of the major axis to the minor axis.

5. The apparatus of claim 1, wherein the image extraction unit determines that the higher the length ratio, the higher a probability that the image is generated by the light emitted from the light source.

6. The apparatus of claim 1, wherein the image extraction unit determines that the higher the mean of the pixel values, the higher the probability that the image is generated by the light emitted from the light source.

7. The apparatus of claim 1, wherein the image extraction unit extracts the image formed by the light emitted from the light source, by searching an entire pixel area of the binarized image by searching each vertical line of the binarized image.

8. The apparatus of claim 1, further comprising a peak point calculation unit searching each vertical line of an entire pixel area of the image formed by the light emitted from the light source, and obtaining a position of a peak point of pixel values in the vertical line.

9. The apparatus of claim 8, wherein the peak point calculation unit finds a pixel position of a peak value in each of the vertical lines of the extracted image formed by the light emitted from the light source, and two boundary positions within a predetermined threshold range relative to the pixel position of the peak value, and according to a parabolic interpolation method using the two boundary positions and the peak pixel value, the peak point calculation unit obtains the position of the peak point.

10. The apparatus of claim 9, wherein if a plurality of positions having the peak value exist, an area having a longer connected length is selected, and a weight center of the area having the longer connected length is determined as the position of the peak value.

11. The apparatus of claim 8, further comprising a distance information calculation unit applying a triangular method to the position of the peak point, thereby calculating the distance.

12. A method of measuring a distance using structured light, in which light is emitted from a predetermined light source and then reflected by an obstacle and the distance is measured using a captured image formed by the light reflected by the obstacle, the method comprising:
binarizing the image;
identifying an image having connected pixels in the binarized image;
obtaining a length ratio of a major axis of the image having the connected pixels to a minor axis perpendicular to the major axis, and a mean of pixel values of the image having the connected pixels; and
extracting an image formed by the light emitted from the light source, from the images having the connected pixels using the length ratio and the mean of the pixel values.

13. The method of claim 12, wherein the light source is a line laser.

14. The method of claim 12, further comprising performing principle component analysis (PCA) transformation of the image having the connected pixels, and using the transformed image, obtaining the length ratio of the major axis to the minor axis.

15. The method of claim 12, wherein the extracting of the image comprises determining that the higher the length ratio, the higher a probability that the image is generated by the light emitted from the light source.

16. The method of claim 12, wherein the extracting of the image comprises determining that the higher the mean of the pixel values, the higher a probability that the image is generated by the light emitted from the light source.

17. The method of claim 12, wherein the extracting of the image comprises extracting the image formed by the light emitted from the light source, by searching each vertical line of an entire pixel area of the binarized image.

18. The method of claim 12, further comprising searching each vertical line of an entire pixel area of the extracted image formed by the light emitted from the light source, and obtaining a peak point of pixel values in the vertical line.

19. The method of claim 18, wherein the searching of each vertical line and obtaining the peak point of the pixel values in the vertical line comprises:
   obtaining a pixel position of a peak value in each vertical line of the extracted image formed by the light emitted from the light source;
   identifying two boundary positions in a predetermined threshold range relative to the pixel position of the peak value; and
   obtaining a position of a peak point according to a parabolic interpolation method using the pixel position of the peak value, the peak pixel value, the two boundary positions, and the pixel values of the two boundary positions.

20. The method of claim 19, wherein if a plurality of positions having the peak pixel value exist, an area having a longer connected length is selected, and the weight center of the connected area is determined as the position of the peak pixel value.

21. The method of claim 18, further comprising applying a triangular method to the position of the peak point, thereby calculating the distance to the obstacle.

* * * * *